United States Patent
Ko

(10) Patent No.: US 12,377,906 B2
(45) Date of Patent: Aug. 5, 2025

(54) DAMPER FOR ELECTRIC POWER STEERING

(71) Applicant: HL MANDO CORPORATION, Pyeongtaek-si (KR)

(72) Inventor: Bongsung Ko, Yongin-si (KR)

(73) Assignee: HL MANDO CORPORATION, Pyeongtaek-si (KR)

( * ) Notice: Subject to any disclaimer, the term of this patent is extended or adjusted under 35 U.S.C. 154(b) by 296 days.

(21) Appl. No.: 18/102,282

(22) Filed: Jan. 27, 2023

(65) Prior Publication Data
US 2023/0242175 A1    Aug. 3, 2023

(30) Foreign Application Priority Data

Jan. 28, 2022  (KR) .................. 10-2022-0012846

(51) Int. Cl.
| | | |
|---|---|---|
| B62D 5/04 | (2006.01) | |
| F16F 1/36 | (2006.01) | |
| F16F 1/373 | (2006.01) | |
| F16H 57/00 | (2012.01) | |

(52) U.S. Cl.
CPC ......... *B62D 5/0403* (2013.01); *B62D 5/0454* (2013.01); *F16F 1/3615* (2013.01); *F16F 1/3732* (2013.01); *F16F 2228/066* (2013.01); *F16F 2232/08* (2013.01); *F16F 2236/04* (2013.01)

(58) Field of Classification Search
CPC .. F16F 1/3615; F16F 1/3732; F16F 2228/066; F16F 2232/08; F16F 2236/04; B62D 5/0403; B62D 5/0454; F16H 2057/0213; F16H 57/0006
See application file for complete search history.

(56) References Cited

U.S. PATENT DOCUMENTS

| | | | | |
|---|---|---|---|---|
| 8,517,141 B2 * | 8/2013 | Kim | ...................... | F16C 27/066 |
| | | | | 180/444 |
| 8,905,185 B2 * | 12/2014 | Ko | ...................... | F16H 57/0006 |
| | | | | 180/444 |
| 9,091,337 B2 * | 7/2015 | Ko | .......................... | F16H 57/039 |
| 11,148,712 B2 * | 10/2021 | Oh | ........................ | B62D 5/0454 |
| 2011/0147113 A1 * | 6/2011 | Ko | ......................... | F16H 57/039 |
| | | | | 180/444 |
| 2014/0041475 A1 * | 2/2014 | Ko | ........................... | B62D 3/04 |
| | | | | 74/427 |
| 2022/0379952 A1 * | 12/2022 | Ko | ...................... | F16H 57/0006 |

FOREIGN PATENT DOCUMENTS

| | | | |
|---|---|---|---|
| KR | 101043632 B1 | * | 6/2011 |
| KR | 20110076112 A | * | 7/2011 |
| KR | 20180115131 A | * | 10/2018 |
| KR | 102033558 B1 | * | 10/2019 |

* cited by examiner

*Primary Examiner* — Thomas W Irvin
(74) *Attorney, Agent, or Firm* — Hauptman Ham, LLP

(57) ABSTRACT

A damper for electric power steering disposed on each of opposite ends of a worm shaft includes a rubber unit made of a rubber material, and a damper frame disposed on each of opposite sides of the rubber unit. The rubber unit includes a concave part which is concavely formed by forming a groove on an outer circumference thereof, and a convex part which is a convex remaining part.

6 Claims, 9 Drawing Sheets

DAMPER FOR ELECTRIC POWER STEERING

CROSS-REFERENCE TO RELATED APPLICATIONS

This application claims benefit and priority to Korean Patent Application No. 10-2022-0012846, filed on Jan. 28, 2022, with the Korean Intellectual Property Office, the disclosure of which is incorporated herein in its entirety by reference.

TECHNICAL FIELD

The present disclosure relates to a damper for electric power steering (EPS) and, more particularly, to a damper having a stopper function for preventing rattle noise in a column type electric power steering (C-EPS) configured such that an assist motor is coupled to a steering column.

BACKGROUND

Generally, a power steering device which generates the steering force of a vehicle is operated to enable quick steering while lightly and smoothly operating a steering wheel.

Such a power steering device has advantages in that it can be steered with a small force, can be selected regardless of the operating force of a steering gear ratio, and can absorb shock from an uneven road surface and prevent it from being transmitted to the steering wheel.

Recently, electric power steering (EPS) is used to drive a motor in an electric control unit (ECU) depending on the operating conditions of the vehicle detected by a vehicle speed sensor and a steering torque sensor, thus providing light and comfortable steering feel at low speed, providing heavy steering feeling and good directional stability at high speed, and providing optimal steering conditions to a driver by enabling rapid steering in the case of emergency.

The electric power steering (EPS) supports a steering force with the power of the motor without using hydraulic pressure. To this end, the electric power steering is provided with a motor which is controlled by an electric control unit (ECU) to generate power, a worm shaft which is rotated by the motor, and a worm wheel which engages with the worm shaft, thus transmitting the rotating force of the worm wheel to a gearbox to assist steering force.

Such electric power steering (EPS) is classified into a column type (C-EPS), a pinion type (P-EPS), and a rack type (R-EPS) according to an installation position.

In the rack type, an electric motor is provided in a rack, so that a steering force according to the steering of a steering wheel is generated by sliding a rack bar leftwards and rightwards by the driving force of a motor. In the pinion type, load applied to a shaft or a joint is reduced because an assist motor is coupled to a pinion to assist the pinion. In the column type, an assist motor is coupled to a steering column.

In the column type electric power steering (C-EPS), gears of a worm shaft and a worm wheel engage with each other to transmit a rotating force. In this structure, abrasion gradually occurs between contact parts of a rotary part with the passage of time. In particular, rattle noise is inevitably caused in a portion where the worm and worm wheel rotatably engage as the axial play of the worm shaft increases.

In order to prevent the rattle noise, a damper is mounted in the direction of the worm shaft.

Referring to FIGS. 1 and 2, in the general column type electric power steering (C-EPS), ball bearings 40 and 41 are disposed on both ends of a worm shaft 10, and a damper 50 is coupled to an end outside each of the ball bearings. Such a structure is similarly shown in Korean Patent No. 10-2018-0094310 (Patent Document 1), which is the prior art. The structure of the damper 50 applied to a worm assembly of FIGS. 1 and 2 is shown in FIG. 3. The damper 50 includes a rubber unit 52 made of a rubber material, and damper frames 51 and 51a provided on both sides of the rubber unit 52.

When a load is applied to the damper 50 by an external factor which causes rattle noise, the damper 50 undergoes approximately linear compressive deformation (see FIG. 4). In order to prevent the excessive compression of the rubber unit 52 in the damper 50, a stopping function is required.

The stopping function of the damper in a conventional rattle noise prevention (de-rattle) structure is determined by several peripheral parts. In this environment, there is a problem that a difference in stopping performance occurs according to the tolerance of the parts.

DOCUMENTS OF RELATED ART (Patent Document 1) KR 10-2018-0094310 (Aug. 23, 2018)

SUMMARY

Accordingly, the present disclosure has been made keeping in mind the above problems occurring in the related art, and an objective of the present disclosure is to provide a damper for electric power steering (EPS) having a stopping function so as to reduce the variation in stopping performance.

The present disclosure provides a damper for electric power steering disposed on each of opposite ends of a worm shaft, the damper including a rubber unit made of a rubber material, and a damper frame disposed on each of opposite sides of the rubber unit. The rubber unit may include a concave part which is concavely formed by forming a groove on an outer circumference thereof, and a convex part which is a convex remaining part.

Further, the concave part of the rubber unit may be formed to be parallel to the damper frame.

Further, the concave part of the rubber unit may be formed in the shape of whirlwind like threads.

Further, the concave part may be first compressed and deformed when load is applied thereto.

Further, a compressive deformation amount may be reduced according to an increase in load after neighboring convex parts contact each other as the applied load increases.

ADVANTAGEOUS EFFECTS

As described above, a damper for electric power steering according to the present disclosure is advantageous in that the damper has its own stopping function, so that variation in stopping performance can be reduced, and an existing peripheral part having a stopping function can be omitted or simplified.

DETAILED DESCRIPTION

Hereinafter, a damper for electric power steering (EPS) according to the present disclosure will be described in detail with reference to FIGS. 5 to 9.

Figure 1:
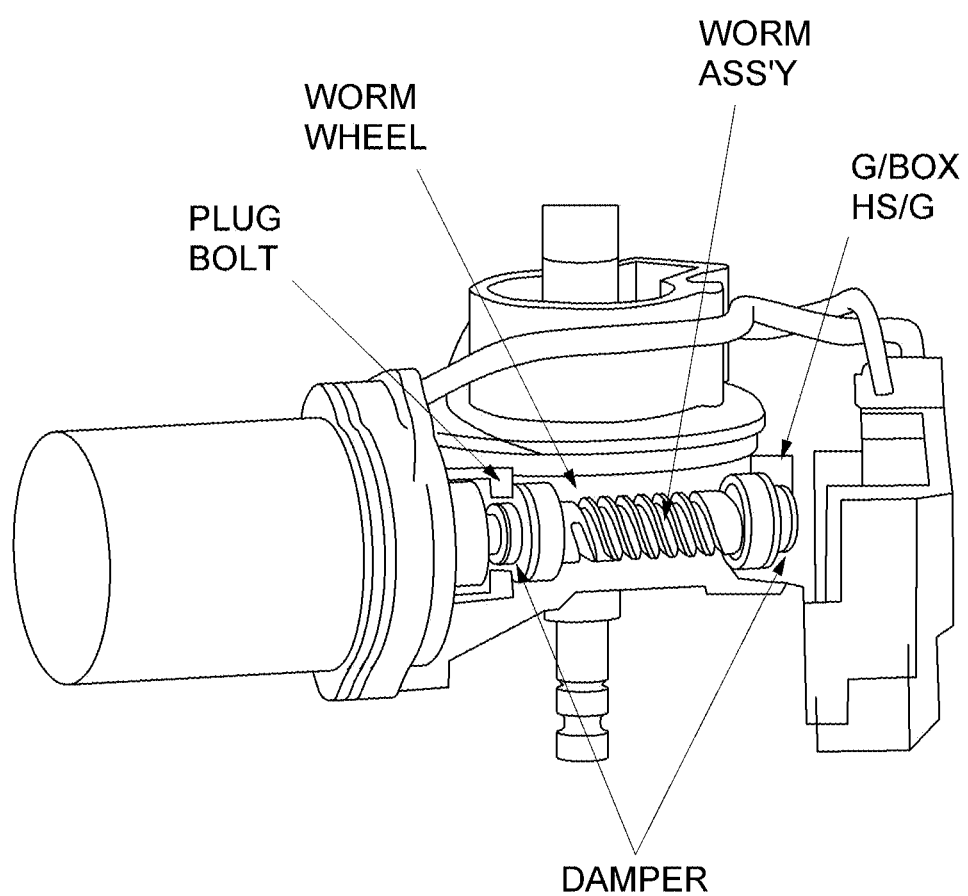
FIGS. 1 and 2 are diagrams showing a state in which a damper is mounted in conventional column type electric power steering (C-EPS).
Figure 2:
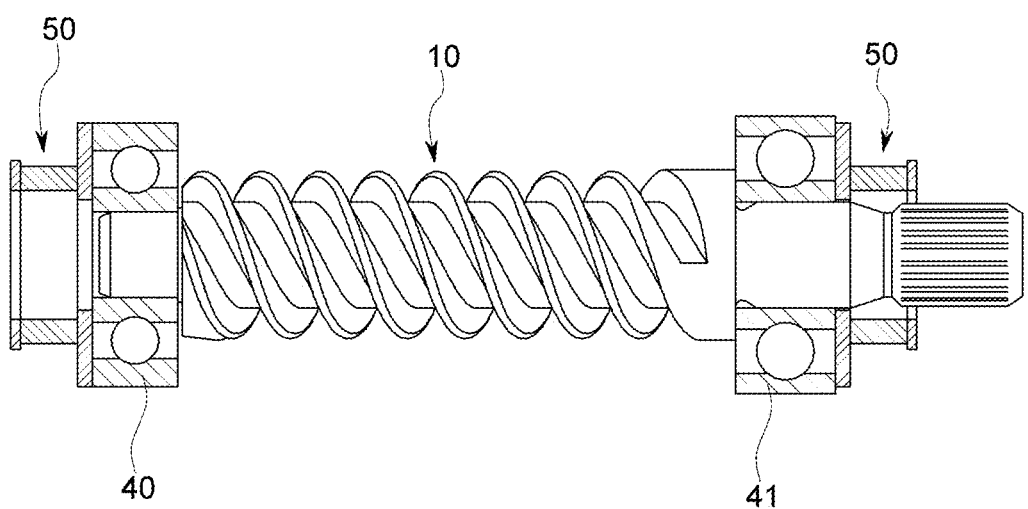
Figure 3:
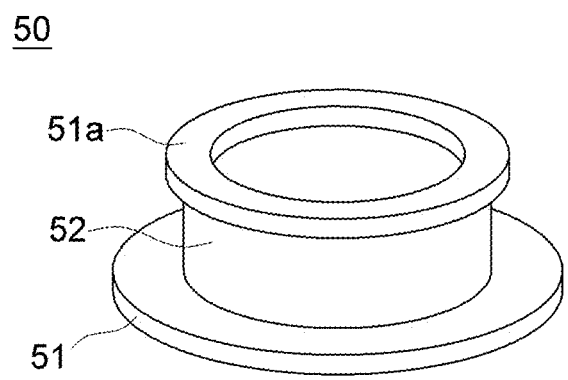
FIG. 3 is a diagram showing the structure of the damper of FIGS. 1 and 2.
Figure 4:
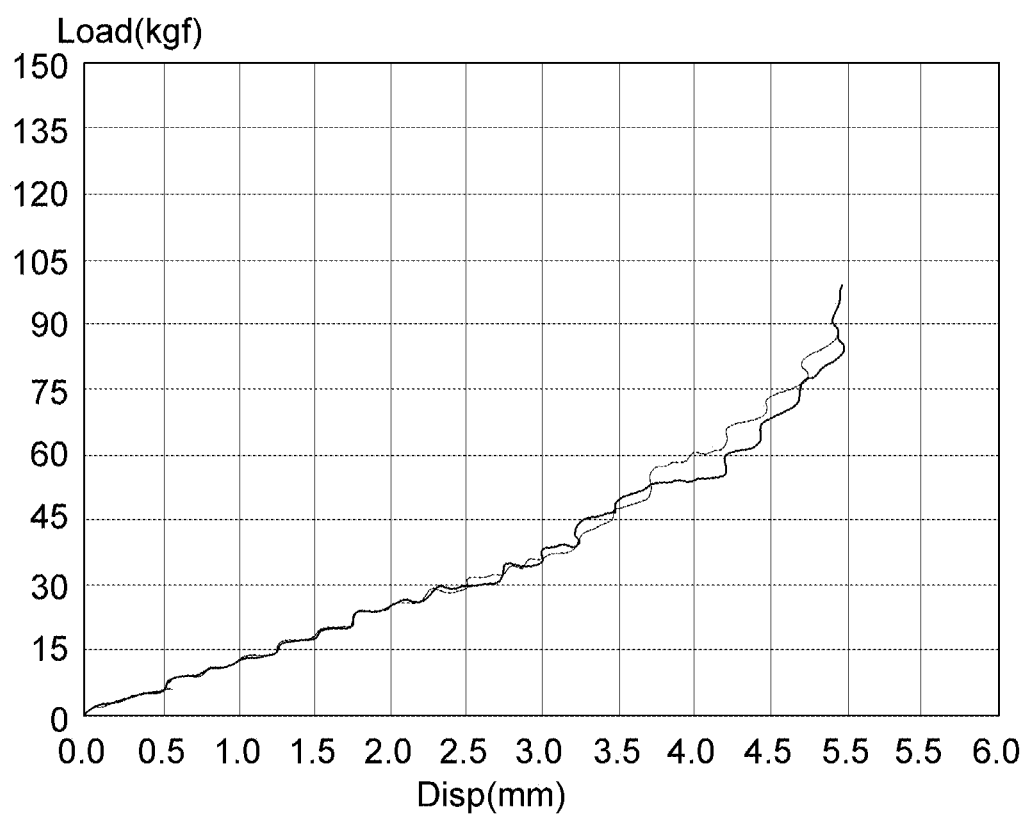
FIG. 4 is a graph showing deformation depending on the load of the damper of FIG. 3.
Figure 5:
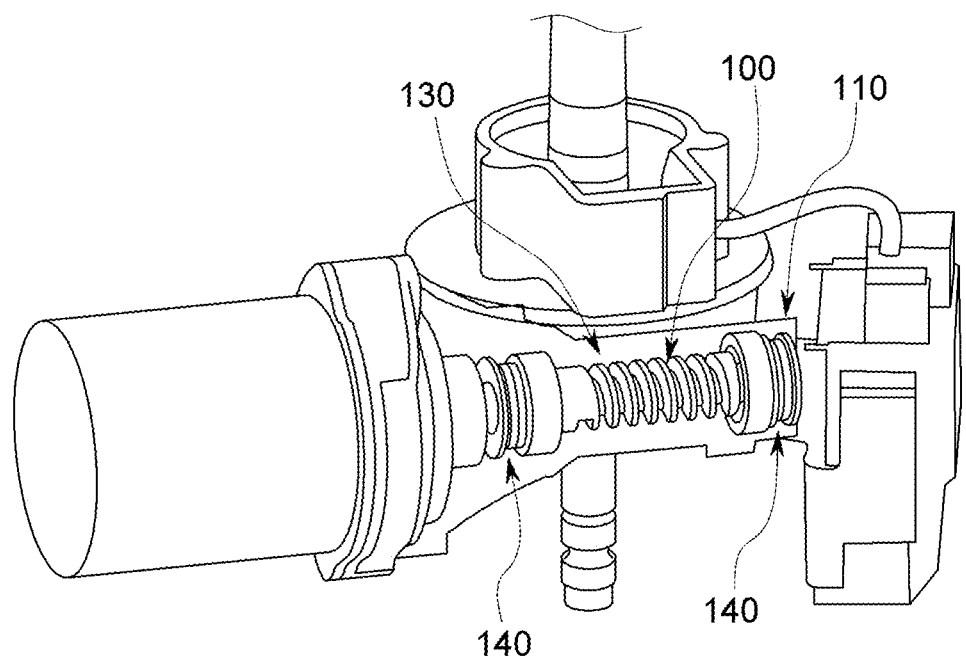
FIGS. 5 and 6 are diagrams showing a state in which a damper for electric power steering (EPS) according to an embodiment of the present disclosure is mounted.
Figure 6:
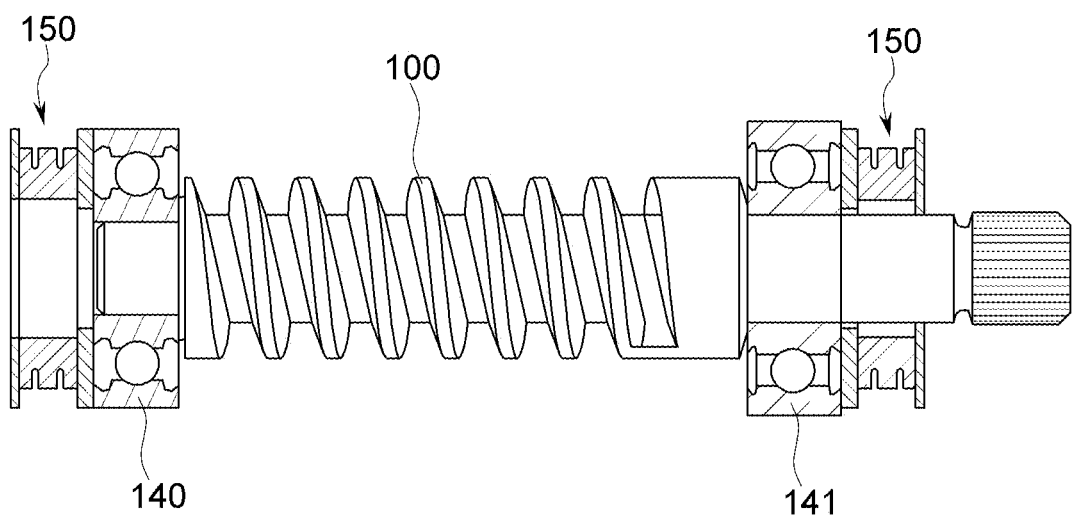

FIGS. 5 and 6 are diagrams showing a state in which a damper for electric power steering (EPS) according to an embodiment of the present disclosure is mounted.

Ball bearings 140 and 141 are disposed on both ends of a worm shaft 100 connected to an assistant motor shaft, and a damper 150 is disposed outside each of the ball bearings 140 and 141. The damper 150 disposed on the left side of FIGS. 5 and 6 is adjacent to a motor to perform a damping function, while the damper 150 disposed on the right side thereof is adjacent to a gearbox housing to perform a damping function.

Figure 7:
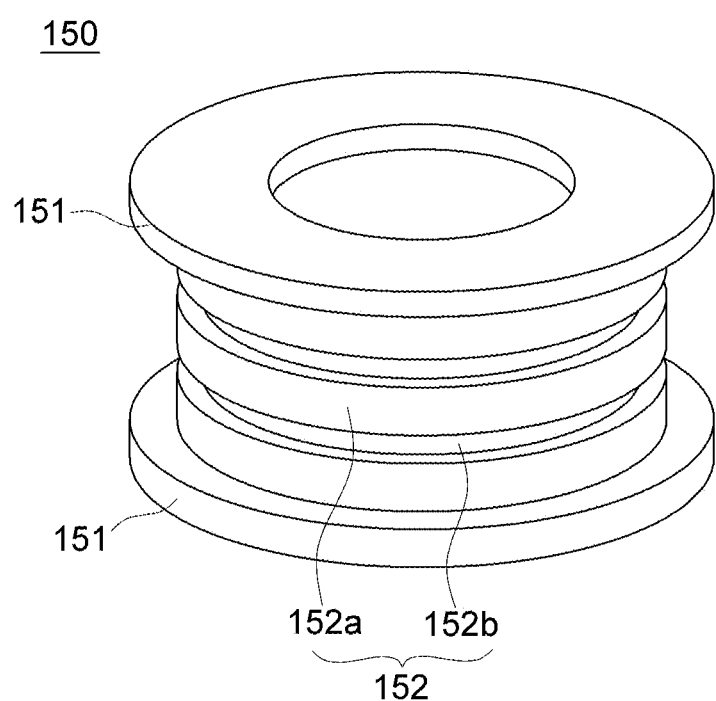
FIG. 7 is a diagram showing the structure of the damper for the electric power steering (EPS) according to an embodiment of the present disclosure.

FIG. 7 shows the structure of the damper 150 for the electric power steering (EPS) according to an embodiment of the present disclosure.

The damper 150 includes a rubber unit 152 made of a rubber material, and damper frames 151 provided on both sides of the rubber unit 152.

The rubber unit 152 may include a concave part 152*b* which is concavely formed by forming a groove on an outer circumference of the rubber unit, and a convex part 152*a* which is a relatively convex remaining part. The concave part 152*b* of the rubber unit 152 may be formed of one or more concave parts parallel to the damper frame 151, and may be formed in the shape of whirlwind like threads.

When a load is applied to the damper 150, the deformable rubber unit 152 is compressed and deformed. When a low load is applied to the damper, the concave part 152*b* is first compressed and deformed. When the applied load increases, the compressive deformation amount of the concave part 152*b* increases until the concave part 152*b* is compressed and deformed as shown in FIG. 8.

Figure 8:
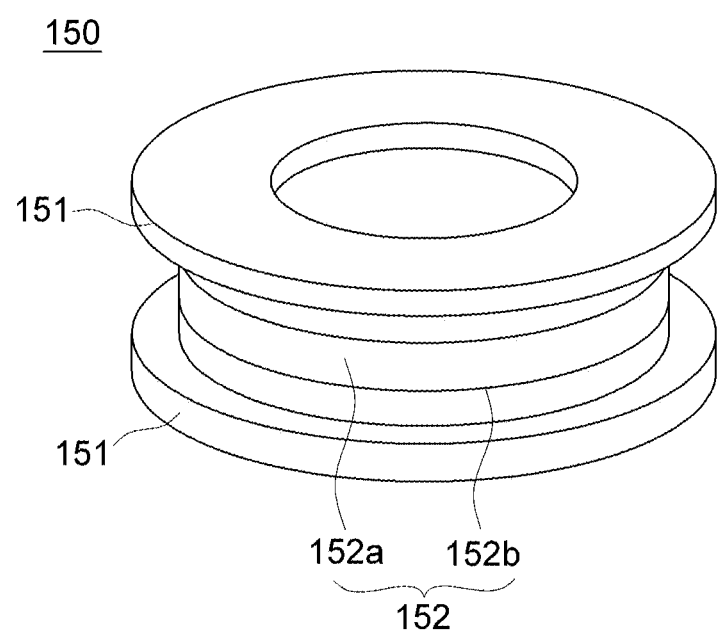
FIG. 8 is a diagram showing a state in which the damper for the electric power steering (EPS) according to an embodiment of the present disclosure is compressed.

As shown in FIG. 8, after the concave part 152*b* is compressed until neighboring convex parts 152*a* contact each other, the convex part 152*a* is also compressed and deformed together. At this time, resistance to compressive load increases. That is, when the deformation amount of the concave part 152*b* reaches a certain value, neighboring convex parts 152*a* contact each other. Since resistance increases from this point on, a kind of stopping function for compressive deformation is implemented.

Figure 9:
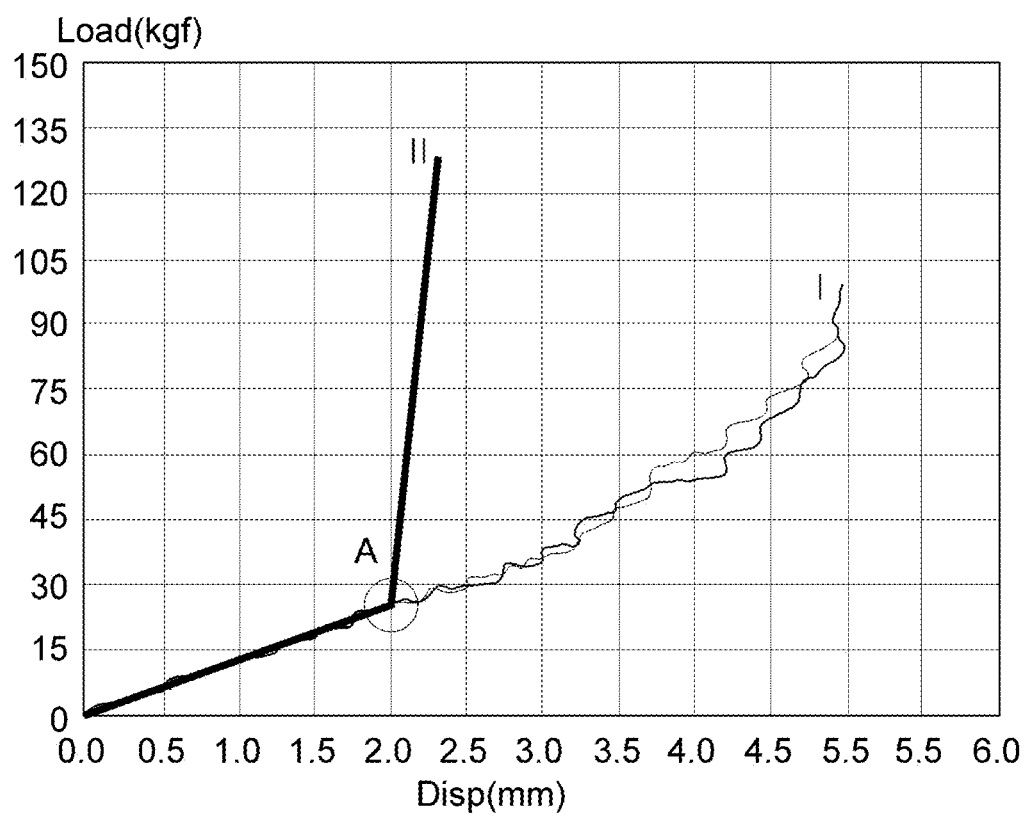
FIG. 9 is a graph showing deformation depending on the load of the damper for the electric power steering (EPS) according to an embodiment of the present disclosure.

FIG. 9 is a graph showing a deformation amount depending on load applied to the damper 150. In FIG. 9, I is a load-deformation graph of the conventional damper 50, and II is a load-deformation graph of the damper 150 according to the present disclosure.

Comparing graphs I and II, as the applied load increases, the rubber unit of the damper undergoes linear compressive deformation in the same manner. From when a certain load is applied (point A in FIG. 9), linear compressive deformation is maintained in graph I, whereas a compressive deformation amount depending on the load is relatively decreased as the resistance of the damper is increased in graph II.

As seen from the graph of FIG. 9, in the damper 150 according to the present disclosure, when load reaches a certain load value, neighboring convex parts 152*a* of the rubber unit 152 contact each other, so that resistance increases and the stopping function is implemented, thereby preventing excessive compression.

As described above, in the damper 150 for the electric power steering (EPS) according to the present disclosure, the rubber unit 152 includes the convex part 152*a* and the concave part 152*b*, so that the damper has its own stopping function when load is applied thereto, thereby preventing excessive compression. Since the damper itself has the stopping function as such, variation in stopping performance can be reduced and an existing peripheral part having a stopping function can be omitted or simplified.

The above description is merely exemplary description of the technical scope of the present disclosure, and it will be understood by those skilled in the art that various changes and modifications can be made without departing from original characteristics of the present disclosure. Therefore, the embodiments disclosed in the present disclosure are intended to explain, not to limit, the technical scope of the present disclosure, and the technical scope of the present disclosure is not limited by the embodiments. The protection scope of the present disclosure should be interpreted based on the following claims and it should be appreciated that all technical scopes included within a range equivalent thereto are included in the protection scope of the present disclosure.

DETAILED DESCRIPTION OF MAIN ELEMENTS 10, 100: worm shaft
110: gearbox housing
130: worm wheel
40, 41, 140, 141: ball bearing
50, 150: damper
51, 51*a*, 151: damper frame
52, 152: rubber unit
512*a*: convex part
152*b*: concave part

What is claimed is:

1. A damper for electric power steering, the damper comprising:
   a rubber unit made of a rubber material; and
   a damper frame disposed on each of opposite sides of the rubber unit,
   wherein the rubber unit comprises a concave part which is concavely formed by forming a groove on an outer circumference thereof, and a convex part which is a convex remaining part,
   wherein the damper is disposed on each of opposite ends of a worm shaft,
   wherein a direction in which the opposite ends of the worm shaft are extending is defined as an axial direction, and
   wherein a width of the concave part in the axial direction is smaller than a width of the convex part in the axial direction.

2. The damper of claim 1, wherein the concave part of the rubber unit is formed to be parallel to the damper frame.

3. The damper of claim 2, wherein the concave part is formed in plural number.

4. The damper of claim 1, wherein the concave part of the rubber unit includes a thread having a whirlwind shape.

5. The damper of claim 1, wherein the concave part is first compressed and deformed when load is applied thereto.

6. The damper of claim 5, wherein a compressive deformation amount is reduced according to an increase in load after neighboring convex parts contact each other as the applied load increases.

* * * * *